(12) United States Patent
Poysa et al.

(10) Patent No.: US 8,736,929 B2
(45) Date of Patent: May 27, 2014

(54) RECORDING AND RECALLING OF SCAN BUILD JOB AND SCAN BATCH JOB SETTINGS

(75) Inventors: Kari K. Poysa, Macedon, NY (US); Timothy L. Dioguardi, Rochester, NY (US); Paul R. Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 37 days.

(21) Appl. No.: 13/526,978

(22) Filed: Jun. 19, 2012

(65) Prior Publication Data

US 2013/0335793 A1    Dec. 19, 2013

(51) Int. Cl.
*H04N 1/46* (2006.01)

(52) U.S. Cl.
USPC ........... 358/505; 358/403; 358/504; 709/218; 382/275

(58) Field of Classification Search
USPC ............... 358/2.25, 403, 1.16, 505, 501, 406, 358/504, 450, 540, 3.28, 1.9; 709/220, 218, 709/222, 203; 382/274, 275
See application file for complete search history.

(56) References Cited

U.S. PATENT DOCUMENTS

| | | | |
|---|---|---|---|
| 5,337,159 A | 8/1994 | Iida et al. | |
| 5,452,105 A | 9/1995 | Tamagaki et al. | |
| 5,465,160 A | 11/1995 | Kamo et al. | |
| 5,585,936 A | 12/1996 | Eto et al. | |
| 5,613,046 A | 3/1997 | Dermer | |
| 5,625,720 A | 4/1997 | Miyaza et al. | |
| 5,654,807 A | 8/1997 | Miyaza et al. | |
| 6,032,004 A | 2/2000 | Mirabella, Jr. et al. | |
| 6,034,785 A | 3/2000 | Itoh | |
| 6,038,036 A * | 3/2000 | Kenmochi | 358/434 |
| 6,424,433 B1 * | 7/2002 | Miyauchi et al. | 358/471 |
| 6,535,914 B1 | 3/2003 | Pearson et al. | |
| 6,977,665 B2 | 12/2005 | Yokouchi et al. | |
| 7,079,269 B2 | 7/2006 | Teeuwen et al. | |
| 7,221,800 B2 | 5/2007 | Sesek et al. | |
| 7,280,782 B2 * | 10/2007 | Maeda et al. | 399/81 |
| 7,443,548 B2 * | 10/2008 | Sprague et al. | 358/474 |
| 7,457,464 B2 | 11/2008 | Stevens et al. | |
| 7,609,408 B2 | 10/2009 | Hayashi et al. | |
| 7,644,119 B1 | 1/2010 | Anooshfar | |
| 7,843,586 B2 | 11/2010 | Ferlitsch | |
| 7,859,696 B2 | 12/2010 | Minowa | |

(Continued)

OTHER PUBLICATIONS

Office Action Communication dated Oct. 21, 2013, U.S. Appl. No. 13/527,086, filed Jun. 19, 2012, pp. 1-14.

(Continued)

*Primary Examiner* — Negussie Worku
(74) *Attorney, Agent, or Firm* — Gibb & Riley, LLC

(57) ABSTRACT

Methods perform at least two different segments of a scan job by sequentially scanning the different segments using an optical scanner. Each of the different segments is scanned with the optical scanner manually set to different settings. The methods automatically combine the different settings to produce a recurring scan workflow. The recurring scan workflow includes such different settings of the different segments and information of the number of pages scanned in each of the different segments. Further, such methods perform at least one later scan job having later segments corresponding to the different segments of the original scan job after creating the recurring scan workflow. During the later scan job the computerized device automatically changes settings of the optical scanner between the later segments, without requiring the user to manually change the different settings between the later segments.

20 Claims, 5 Drawing Sheets

(56) References Cited

U.S. PATENT DOCUMENTS

| | | |
|---|---|---|
| 7,894,679 B2 * | 2/2011 | Nagarajan et al. ............ 382/232 |
| 8,004,698 B2 | 8/2011 | Sano |
| 8,218,202 B2 | 7/2012 | Hunter et al. |
| 8,542,404 B2 * | 9/2013 | Usui .............................. 358/1.9 |
| 2001/0043340 A1 * | 11/2001 | Murata .......................... 358/1.9 |
| 2004/0150854 A1 | 8/2004 | Sprague et al. |
| 2010/0033744 A1 | 2/2010 | Maeda |
| 2010/0097640 A1 | 4/2010 | Kim et al. |
| 2011/0192894 A1 | 8/2011 | Ragnet et al. |
| 2012/0127540 A1 | 5/2012 | Moore et al. |
| 2012/0218598 A1 * | 8/2012 | Utsunomiya ................ 358/1.15 |
| 2013/0222872 A1 * | 8/2013 | Otsuka .......................... 358/505 |

OTHER PUBLICATIONS

U.S. Appl. No. 13/527,086, filed Jun. 19, 2012, Notice of Allowance dated Feb. 4, 2014, 14 pages.

* cited by examiner

RECORDING AND RECALLING OF SCAN BUILD JOB AND SCAN BATCH JOB SETTINGS

CROSS-REFERENCE TO RELATED APPLICATIONS

This application is related to the following co-pending application filed concurrently herewith by the same Assignee: "DETECTING COMMON ERRORS IN REPEATED SCAN WORKFLOWS BY USE OF JOB PROFILE METRICS", Ser. No. 13/527,086. The complete disclosure of this co-pending application is incorporated herein by reference.

BACKGROUND

Embodiments herein generally relate to scanners, scanning systems, and scanning methods, and more particularly to method that provide and detect errors in scanning workflows. A user who builds a scan job (e.g., scan to email, scan to workflow, etc.) that includes different scan job segments may desire to change scan settings between the scan job segments. For example, different segments of the scan job may have different resolutions, numbers of sides (1-sided or 2-sided), orientations, color modes, contrasts, etc., and the user may desire to apply different settings to these different segments. This allows for one set of pages (a segment) to be scanned and processed with one scan settings (for example black & white, 1-sided) and a subsequent segment to be scanned with different settings (for example color, 2-sided). Scan settings can be saved by a workflow creator and later recalled for use by a scan operator for another scan job. However, only one scan job segment settings are saved and recalled. The scan operator must manually change the subsequent segments' settings. Additionally, if multiple documents requiring similar build job settings need to be scanned for the same workflow, these documents need to be processed manually as individual jobs. The manual steps introduce operator error and lower productivity.

A scanner or MFD (Multi Function Device) is often used as the on-ramp to a scan workflow. Common errors during scanning are caused by both operator and the ADH (Automatic Document Handler) equipment. Problems include originals fed in wrong order, wrong orientation, misfeeds causing missing originals, skewed originals, originals fed wrong side up, originals missing, originals scanned with wrong scan settings.

SUMMARY

In view of the foregoing, exemplary methods herein perform at least two different segments of a scan job by sequentially scanning the different segments using an optical scanner. The optical scanner can be integral with a computerized device or operatively connected to (directly or indirectly connected to) the computerized device. Each of the different segments is scanned with the optical scanner manually set to different settings. The different settings include resolution, number of sides, orientation, color mode, contrast, etc.

The methods herein automatically combine the different settings to produce a recurring scan workflow using the computerized device. The recurring scan workflow includes such different settings of the different segments and information of the number of pages scanned in each of the different segments. Thus, for example, each of the different segments has at least one individual setting that is different from another one of the different segments.

Further, methods herein perform at least one later scan job having later segments corresponding to the different segments of the original scan job after creating the recurring scan workflow. The later segments corresponding to the different segments by having the same type, size, and number of sheets as corresponding ones of the different segments, and the later segments comprising different printing on the sheets from corresponding sheets of the different segments. During the later scan job the computerized device automatically changes settings of the optical scanner between the later segments, without requiring the user to manually change the different settings between the later segments.

Some methods herein can set tolerances for the recurring scan workflow, using the computerized device. The tolerances are ranges within which the different settings are considered acceptable. In such embodiments the methods herein determine if the later segments are within the tolerances. Further, when the later segments are not within the tolerances, such embodiments can stop the later segment that is out of tolerance. Alternatively, such embodiments can merely pause the later segment that is out of tolerance and provide the user options to modify the tolerances. In addition, methods herein can transmit scan image data files produced for each of the later segments to different destinations.

Other exemplary methods herein perform a first scan job by manually establishing first scan settings using a computerized device. The computerized device comprising an optical scanner. The optical scanner can be integral with the computerized device or operatively connected to the computerized device.

When performing the first scan job, such methods perform a first scanning operation. The first scanning operation scans one or more first items using the optical scanner set to the first scan settings. The first scanning operation produces a first scanned image data file and a first scanning operation data file. When performing the first scan job, such methods also automatically record the first scan settings and the first scanning operation data file as a first scan job segment in a non-transitory computer-readable storage medium. The computer-readable storage medium can be integral with the computerized device or operatively connected to the computerized device.

Additionally, such methods perform one or more subsequent scan jobs by manually establishing one or more subsequent scan settings using the computerized device. The first scan settings and the subsequent scan settings comprise, for example, settings for resolution, number of sides, orientation, color mode, contrast, original type, TRC (Tone Reproductive Curve), lighten/darken, sharpness, saturation, background suppression, compression factor, original size, edge erase, blank page removal, as well as other settings depending upon implementation. The subsequent scan settings each have at least one individual setting that is different from a corresponding setting within the first scan settings.

When performing the subsequent scan jobs, such methods perform one or more subsequent scanning operations. Each of the subsequent scanning operations scans one or more subsequent items using the optical scanner set to a corresponding different one of the subsequent scan settings. The subsequent scanning operations produce one or more subsequent scanned image data files and one or more subsequent scanning operation data files. When performing the subsequent scan jobs, such methods also automatically record the subsequent scan settings and the subsequent scanning operation data files as one or more subsequent scan job segments (individually for each of the subsequent scan jobs) in the computer-readable storage medium.

The methods herein automatically combine the first scan job segment and the subsequent scan job segments to produce a recurring scan workflow, using the computerized device. The first scanning operation data file and the subsequent scanning operation data files also contain information of the number of pages scanned. The methods herein then perform at least one later scan job after creating the recurring scan workflow.

During the later scan job the computerized device automatically changes settings of the optical scanner between segments of the later scan job that correspond to the first scan job and the subsequent scan jobs, without manually changing settings of the optical scanner. The computerized device similarly automatically changes settings of the optical scanner between each segment of the later scan job that correspond to the subsequent scan jobs, without manually changing settings of the optical scanner. The segments of the later scan job correspond to the first scan job and the subsequent scan jobs by having the same type, size, and number of sheets as the first scan job and the subsequent scan jobs, respectively; however, the segments of the later scan job have different printing on sheets corresponding to the first scan job and the subsequent scan jobs.

The methods herein can also set tolerances for the recurring scan workflow, using the computerized device. The tolerances comprise ranges within which the different settings are considered acceptable. Further, when the later segments are not within the tolerances, such embodiments can stop the later segment that is out of tolerance. Alternatively, such embodiments can merely pause the later segment that is out of tolerance and provide the user options to modify the tolerances.

Embodiments herein also provide a non-transitory computer-readable storage medium storing instructions executable by a computerized device. The instructions cause the computerized device to perform a method that performs at least two different segments of a scan job by sequentially scanning the different segments using an optical scanner. Each of the different segments is scanned with the optical scanner manually set to different settings.

The methods herein automatically combine the different settings to produce a recurring scan workflow. The recurring scan workflow includes such different settings of the different segments and information of the number of pages scanned in each of the different segments. Further, methods herein perform at least one later scan job having later segments corresponding to the different segments of the original scan job after creating the recurring scan workflow. During the later scan job the computerized device automatically changes settings of the optical scanner between the later segments, without requiring the user to manually change the different settings between the later segments.

These and other features are described in, or are apparent from, The following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
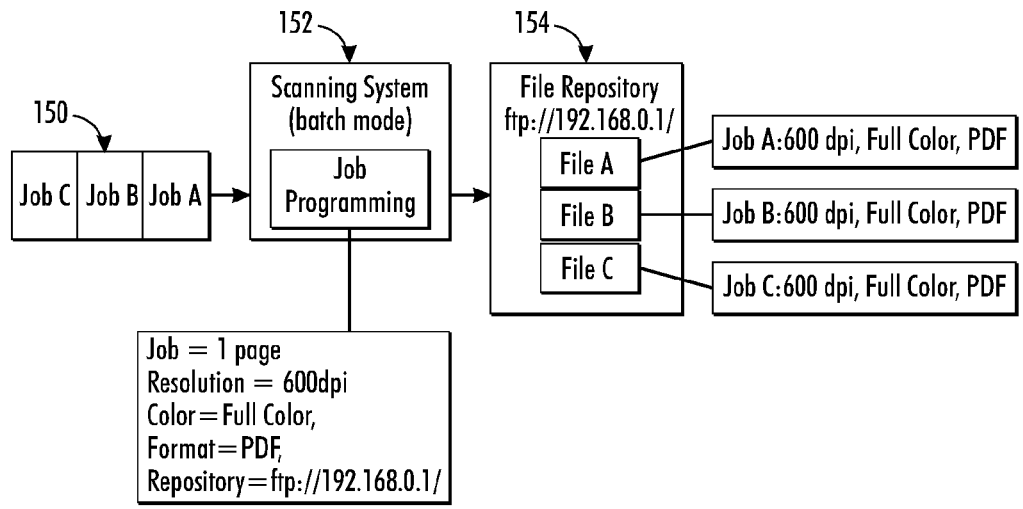
FIG. 1 is a schematic diagram of a system illustrating the operation of various embodiments herein.

In view of the issues mentioned above, embodiments herein enable saving and recalling the settings for each segment of a multi-segment scan job to create a fully automated workflow.

The goal of increasing scanning productivity has attracted much attention in the past. Automatic job boundary detection, automatic scan features (orientation, page ordering) and detecting misfeeds are all aimed at unattended batch scanning. In workflows where similar originals are scanned at multiple occasions, the prerecorded scan job's settings can be leveraged to detect build job segments and job boundaries.

What is referred to herein sometimes as a "scan build job" is a scan workflow where the document to be scanned is made of pages requiring different scan settings. For example, some pages in the scan build job may be 1-sided, black and white, landscape originals requiring OCR processing, while others may be 2-sided, color, portrait originals. Scanning all pages using the same scan settings results in blank back sides of the 1-sided pages, incorrect orientation and undesired image quality which also affects file size. To overcome this, existing scan build job features available in MFP devices allow the users to feed just some of the pages at a time, and then change scan settings between document segments.

If such documents are part of a repeating workflow, the methods and systems herein allow automated recall of the scan settings so that such settings can be automatically used for the subsequent jobs. To do so, the methods and systems herein save the settings used in a "sample" build job, and recall those settings for a sub-sequent job. The recording of the sample build job is also called "build job workflow creation" in this disclosure. In conventional systems, only the first segment settings can be recalled, and the remaining segment settings must be manually entered during the job, thus forcing the operator to stay by the device during scanning.

The process of storing the scan workflow can be done either on the MFP's (Multi Function Product's) local user interface panel as a macro recording of sample scan build job's settings, or off-line using a scan job ticket. If all pages of the build job can be fed automatically by the ADH (Automatic Document Handler), then the recalled build job can be executed with one start button press, without further operator involvement. The scan settings applied to the various segments of the build job will change automatically at prerecorded page counts or upon detection of separator pages.

The sample build job recording and the recalled build job execution varies somewhat depending on whether the user can feed all of the originals at once, or whether the ADH limitations force the operator to manually feed more pages during the job. If user intervention is required to feed parts of the originals due to limitations of the ADH (paper thickness, original size, number of originals), the system will stop and wait until the operator feeds the additional originals and presses continue. Additionally, if the operator feeds multiple similar documents at once, the system will automatically process the originals in unattended batch job mode—the recalled build job settings are applied to each document producing multiple output files.

In the case where all originals can be fed at once, during the sample build job, each segment's scan settings are saved in a job ticket. Together with the scan settings, the actual page count for each segment is also saved. If the number of pages in a segment can vary from one document to another, the workflow creator may instead specify that a separator sheet (such as a blank sheet, or a sheet with a special color or special markings) shall be used instead of the page count for a segment separator. At the end of the sample build job, the user has the option to save the settings by giving a name for the workflow. The settings can be recalled using this name (for example a scan template name).

When the settings are recalled, the new scan job can be executed with a single start button press. The user is not allowed to change any scan settings during the recalled build job to ensure processing will take place the way the workflow creator intended. The system will start scanning using the first segment's recorded settings. The system will count the number of pages scanned. The system will automatically change scan settings after the pre-determined number of pages for the first segment has been scanned, or optionally after the segment separator sheet has been detected. At that point, the scanning will continue with the second segment settings.

The batch build job results in multiple output digital documents identical to what would have been created by performing the build job manually for each of the documents in the batch. For example "doc001.pdf", "doc002.pdf" and "doc003.pdf".

In many scanners, changing settings on the fly may be difficult. Doing this may also affect scanning speed by being able to scan only a few pages, then stopping scanning for the scanner re-programming and resuming scanning again. Alternatively, the system can inspect the prerecorded scan settings for each build job segment, and determine a common setting to use during scanning of all segments. The resulting digital images are then post-processed such that the desired prerecorded settings are met without affecting scan performance. The setting to use during scanning is carefully selected so that the conversion can be done without image quality loss. For example:

| Setting | Segment-1 Value | Segment-2 | Scan With | Post Process for Segment-1 | Post Process for Segment-2 |
|---|---|---|---|---|---|
| Resolution | 200 | 400 | 400 | 400 → 200 | NA |
| Sided | 1-sided | 2-sided | 2-sided | Drop $2^{nd}$ sides | NA |
| Orientation | Landscape | Portrait | Any | Rotate for Landscape | Rotate for Portrait |
| Color Mode | Black & White | Color | Color | Color → Black & White | NA |
| Contrast | Nominal | Contrast + 1 | Nominal | NA | Contrast + 1 |

Therefore, as shown in the table above, the entire scan job may be scanned at the highest resolution required by any segment, the highest contrast required by any segment, etc., and for 2-sided scanning if at least one segment requires 2-sided scanning. Then, during post-scan processing, before the individual files are saved for each segment, the resolution and contrast for some of the segments can be reduced, and the second sheet sides can be deleted for segments that had single side scanning settings. In this manner, the individual scan files produced will have the characteristics matching the corresponding settings required by each segment in the workflow.

Further, the systems and methods herein can calculate the time that a specific scanner will need to switch between settings (such as switching between resolution settings or switching between 1 and 2-sided scanning) based on, for example, historical empirical data for a certain class or style of scanner. The systems and methods herein can also calculate the number of sheets that will be scanned at an unnecessarily high setting (unnecessarily high resolution, for example) and the extra time that such scanning will take compared to the time needed to perform the scan a lower setting (e.g., lower resolution) mandated by the scan workflow (again based on historical empirical data for a class or style of scanner) to find the "unnecessary" time that the unnecessary scanning will take. Then, the systems and methods herein can automatically determine whether the switching time or the unnecessary scanning time is the shortest time interval, and then automatically proceed with the scan workflow that will take the shortest amount of time.

If the device is not able to implement the different values for a certain scan setting, then during the sample build job recording phase that scan setting cannot be changed after the first segment has been scanned. The setting will be "grayed out", which in effect enforces that all segments will use the same setting. At the end of the last segment, the resulting digital image format document is produced and distributed according to the settings in the original sample build job. If more originals are detected after the last segment, the settings for the last segment are executed for the remaining originals.

In another case, the operator may not be able to feed all originals at once. In this case, during the sample build job recording, when a new segment is being started, the workflow creator can indicate that the scan operator will need to feed additional originals. Upon indicating this, the workflow creator can enter a help text that will be displayed during the recalled job. This help text can guide the operator to insert the correct originals the correct way, displaying a message on the graphic user interface that may read, for example, "Raise the platen cover and insert the loan applicant's photo id to the platen face down, leave platen cover up and press start".

During the recalled build job processing, the help text is displayed to the operator after the originals for the prior segments have been exhausted. If there are subsequent segments where all originals can be fed at once, the recalled job will process as in the first case described above for those segments.

In these situations, the scan operator productivity is greatly improved by not having to manually perform scan setting changes and feed more originals between build job segments, fewer user errors are experienced during the repeated scan jobs because scan settings are automatically recalled, the workflow creators can assign less experienced operators to the scanning task, and in the batch build job case, productivity greatly improved because users are able to scan multiple jobs with feeding originals just one time.

Other aspects of systems and methods herein leverage the repeating nature of many scan workflows. As part of a saved scan workflow settings (scan template), a scan job profile is saved, as described above. As described above, this profile has various metrics for each page in the job, such as expected orientation, expected compressed image byte size, expected original size and the expected total number of pages. With additional embodiments herein, the profile also has acceptable tolerances for each metric. During the creation of the scan job workflow, the system collects the metrics and saves them in the workflow template. The workflow creator provides the user with an option to enter the acceptable tolerance range. Alternatively, the systems and methods herein can provide suggested default tolerance range values from which the user can select. The suggested default tolerance range values are automatically derived from the sample set (as described in greater detail below). When the workflow is recalled for another scan job, the metrics of the newly scanned pages are compared against the previously saved expected values. If the difference exceeds the tolerance, the scanning is stopped and the operator is notified.

Methods exist for automatic job boundary detection, automatic scan features (orientation, page ordering) and detecting misfeeds—all aimed at unattended batch scanning. In workflows where similar originals are scanned at multiple occasions, the prerecorded sample job profile can be used to detect common scan errors such as misfeeds, missing pages, etc. The systems and methods herein leverage the repeated nature of the workflow to catch the errors, which allows the use of more and simpler (faster) metrics and tighter tolerance than more generic approaches aimed at ad-hoc scanning. For example, a blank page may or may not be an error in the general case, but if all of the samples either contained or did not contain a blank page as page #3, then this metric can be used to detect feed errors. Another feature of systems and methods herein is the automatic collection of the metrics during the sample job recording.

As mentioned above, the workflow creator will indicate the start of a sample scan job when creating a scan workflow. This sample job can optionally be a build job where scan settings can change between build job segments. As each page is scanned, the system collects metrics about the page. These metrics can include, for example:

1. Compressed page byte size. The advantage of this metric is that it comes with no performance penalty as a side effect of the normal processing.

2. Detected original page size, for example 8.5×11 or 8.5× 14. The advantage of this metric is that it comes with no performance penalty as a side effect of the normal processing.

3. Detected page orientation.

4. Expected number of pages.

The metrics are saved in the template. In addition to the saved metrics, the workflow creator can enter or select an acceptable tolerance for each applicable metric. For example, ±30% compressed page size, ±0% page size and ±1 total number of pages difference allowed. The workflow creator can enter one set of values for the entire job, or some or all tolerance values for individual pages within the job. The system can also suggest default values for each metric for the job as well as each page. The workflow creator can also disable the use of any particular metric.

If multiple sample jobs are performed (for example in batch scan mode), the system will be able to measure multiple samples of each page. This allows the system to suggest better default values, or not to suggest a particular metric if the measurements vary too much. For example, if orientation varies between samples of page #3, it is not a good metric for that page. The values for metrics like compressed page size can be calculated expecting a normal distribution. The suggested value can, for example, be the calculated mean value of the samples, and the suggested tolerance can be, for example, six times the standard deviation (also called six sigma) expressed in percentages. If the tolerance is so high that the metric cannot be used to even detect a blank page (size of the blank page is near zero depending on the compression algorithm), then the metric is not suggested at all. Those ordinarily skilled in the art would understand that such discussion is merely exemplary, and that the systems and methods herein can use many different options to achieve the same results.

Key measurements and parameters of the distribution are also saved so that the workflow creator can run additional sample originals later in order to specify better expected values and tighter tolerance.

When the template is used by a scan operator for a new scan job for the same workflow, the system compares the expected metrics for the pages against the actual metrics calculated for the newly scanned pages. If the difference is greater than the allowed tolerance, scanning is stopped and the operator is notified of the page number that caused the problem. It is typical in MFP devices that the physical scanning is several pages ahead of the page analysis. Because of this, and to further aid in locating and correcting the problem page, systems and methods herein provide a thumbnail of the page as well as a few preceding pages displayed on the user interface display, or printed on an error sheet.

In case the job was a batch job, where multiple documents are scanned at once, the already completed documents can be filed to the destination(s) even though there was a problem during a subsequent document.

To recover from the error, the operator can correct and re-load the originals into the ADH and re-start the entire job again. In case of a batch scan job, the documents before the problem page do not need to be re-scanned. If the operator knows that the problem original is good, and he/she had to make no correction prior to re-feeding and re-starting the scan job, the operator can select to accept the metrics of the page as good. In this case, the system will add the page metrics into the known sample set of pages.

Further, these aspects of the systems and methods herein are applicable to any "later job" that is using a recalled setting, even if it is not build job (and has only one segment) and even if it is not a batch job (and has multiple separate jobs). Thus, these aspects of the systems and methods herein can analyze and check one non-build, non-batch job with the recalled settings against the tolerances for common errors.

Therefore, systems and methods herein are able to automatically derive scan job profile settings from sample job(s), are able to save and recall such a scan job profile, and are able to use the scan profile to detect common scanning errors using simple and performance efficient metrics in the profile. As mentioned above, this reduces common scan operator errors and ADH equipment errors, and improves scan operator productivity as less manual QA is required.

In the examples above, a job (copy, print, scan, or fax) can be programmed and submitted to a system with the intent of producing a single output (i.e.: a) scan a document at 600 dpi, in full color, b) save as a portable document format (PDF) file, and c) email the PDF file to the job owner). However, the job owner may want the output for each destination to vary. In one example, the job owner may want to segment the job (e.g., 5 images) in a manner that the system process images 1-2 to produce two documents (document A: 600 dpi, full color, PDF, document B: 200 dpi, b&w, PDF) and distributes "Document A" via email and "Document B" via ftp, and then processes images 3-5 to produce one document (document C: 300 dpi, full color, PDF/A) and distributes "Document C" to a SharePoint portal. Existing systems are limited in terms of the flexibility needed to define and execute more comprehensive workflows.

In view of the foregoing, the systems herein produce a variety of outputs based on a single job definition which in turn enables customizable workflows. Some example use cases follow. A small business owner may routinely send a copy of contractual agreements to the signatories via email and archives a copy in a network file repository. A graphics arts company may routinely print a perspective customer's document in high, medium, and low quality in order to demonstrate pricing options. A legal firm may routinely scan case documents which are separated by blank pages. An imaging scientists may need to generate many different combinations/permutations of output.

There are solutions that provide the ability to specify multiple destinations for single job. For example, one workflow system, which may be referred to as "Job Flow Sheets" can be an on-printer workflow that provides the job owner the ability to program a job flow for a scan job that results in the generated document being emailed, sent to a network repository, sent to the multi-function printing device (MFD) local folder for later use, and/or printed. There are also a number of potential workflows/systems that perform post-processing on a document that has been scanned and saved in a network repository. For example, an optical character recognition (OCR) workflow could be performed where the scan system that generates the file does not have OCR capability. Therefore, the systems and methods herein also provide mechanisms for routing the document to such additional locations.

Thus, as shown above, there are many applications (copy, print, scan, fax, etc.) in which the systems and methods herein can be used, but batch mode scanning and build job scanning will be used as the examples in this disclosure. The systems and methods herein can also be used as a plug-in for applications that process images to produce some defined output.

A batch mode scanning workflow can be performed on a stack of original documents that includes many jobs that are similar in some respect (i.e. number of pages, order of pages, and content). All the jobs in the stack of original documents are to be scanned (hard copy to electronic copy) and saved using the specified job programming attributes (i.e. resolution, file format, color mode, file repository) for the batch. The scanning system produces a separate file for each job, and then transfers each file to the specified file repository location.

Such a batch mode scanning workflow provides support for specifying the job boundary for the stack original. Job boundaries are typically defined by the number of pages in each job. More advanced scanning systems support defining a job boundary using an insert sheet of some sort (i.e., a blank sheet). The scanning system may not know how many individual jobs are contained in the stack of originals, so the workflow requires the scanning system to continuously process the stack of originals until there are no more original documents to process.

A build job scanning workflow may include a single job that requires the operator to break the job programming into segments. The reason for this could be that the scan document handler does not support mixed sized originals, or the operator needs to change the job programming for a segment in order to capture the image correctly. Such a scan system produces a single file that includes all the segments of the build job. A major difference between a build job and batch mode job is that the build job uses operator involvement from start to finish, whereas a batch mode job can be left unattended once started.

Figure 2:
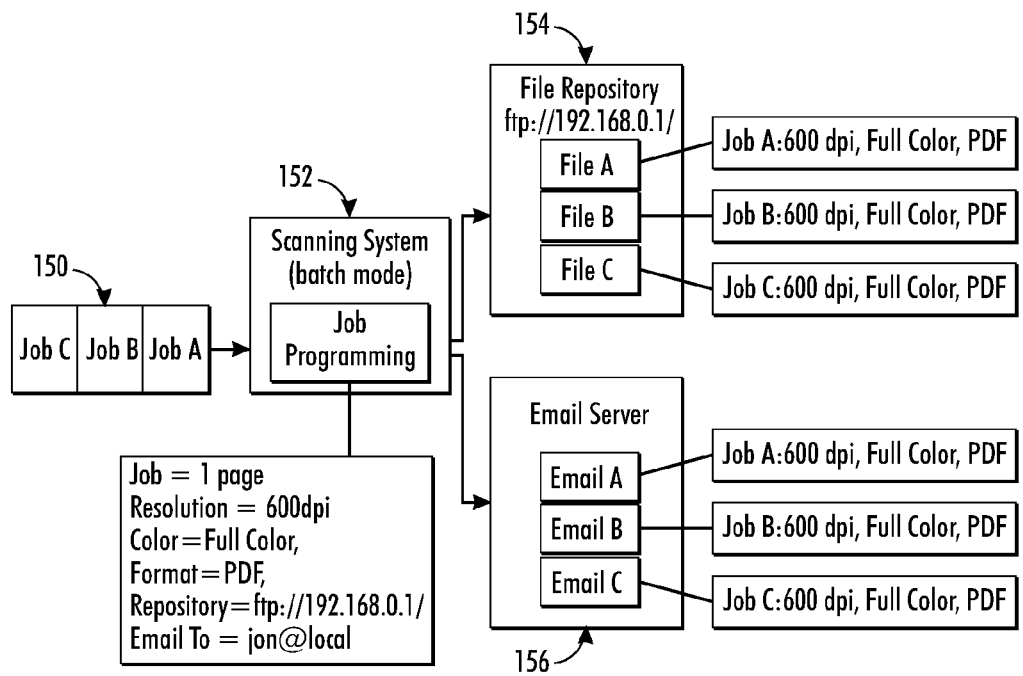
FIG. 2 is a schematic diagram of a system illustrating the operation of various embodiments herein.
Figure 3:
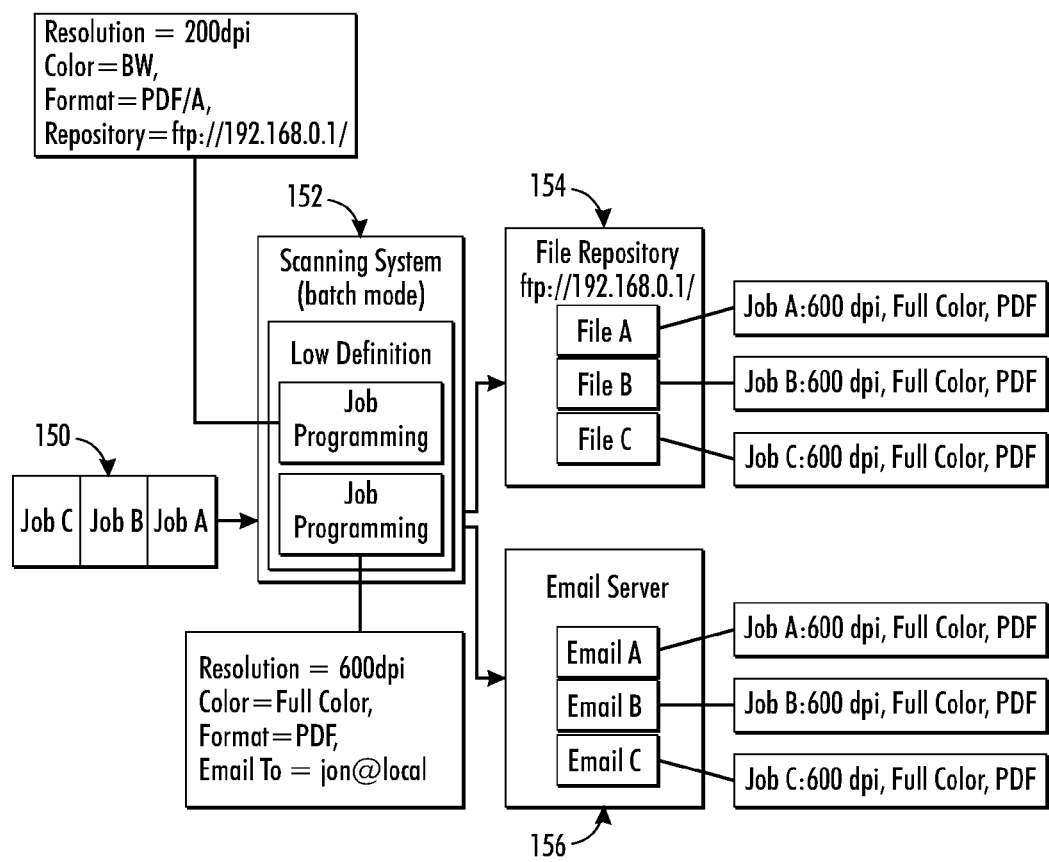
FIG. 3 is a schematic diagram of a system illustrating the operation of various embodiments herein.

A number of examples are shown in FIGS. 1-3 to help illustrate the operations of the systems and methods herein. In one example shown in FIG. 1, at the end of the week Company A may have a stack of single sided forms and signed receipts 150 that need to be archived. Company A has a batch mode scanning workflow processed through a scanning system 152 that is used to generate a high resolution (600 dpi) full color (binary) PDF file for each form and associated receipt, which is sent to a network file repository located off-site 154. In this example the job boundary is defined as every two documents. The number of jobs in the stack is directly related to the amount of business performed that week.

In another example for Company B shown in FIG. 2, a batch mode scan workflow similarly uses a stack of single-page jobs 150 processed through the scanning system 152 that results in a file for each page stored in a file repository 154. In FIG. 2, Company B has the same type of business process as Company A, but the owner of the company would also like the generated files to be emailed to him through an e-mail server 156. Thus, FIG. 2 illustrates an example of a batch mode scan workflow using a stack of single-page jobs which results in a file for each page that is supplied to two different destinations.

The systems and methods herein support cases where additional processing (partitioning or job programming) is desired after scanning, as in Company B's example shown in FIG. 2. The systems and methods herein support a batch mode job that applies the same job programming for the entire workflow (see the example shown in FIG. 1) as well as workflows that extend the job programming to send the generated file to multiple destinations (see the example shown in FIG. 2). This is highly useful because current systems require users to scan anything but the simplest batch jobs manually, where the user enters different scan settings for the various sections of each job.

Further, each page within a job could vary in great degree from other pages within a job. For example, pages may vary in image orientation (landscape/portrait), original size (letter/legal), both sides may contain content (1-sided/2-sided), color versus black & white, text versus images. The pages may also vary greatly depending on the processing needs. For example, low scan resolution may be needed just to capture a barely legible image for archiving purposes versus high scan resolution image that may be needed for OCR or form recognition/text extraction. In addition, the file format required by downstream processing might vary within the job (JPEG for the photo ID and PDF for the scanned 'open account' form). Furthermore, the distribution of the various segments of a job may vary.

Another example is shown in FIG. 3 relating to Company C. Company C has the same type of business process as Company A & B, but the owner of Company C is concerned about the company's archive server storage space. Therefore he wants all the archive files to be generated in black and white at 200 dpi using the PDF/A file format, as well as in full color at 600 dpi using the PDF file format, as shown in the scanner instructions in item 152. Further, Company C's owner wants the files emailed to him in full color at 600 dpi using the PDF file format. The systems and methods herein provide the ability to customize the scan workflow to meet all of the above requirements.

More specifically, the systems and methods herein provide the framework for developing and implementing a flexible mechanism to provide fine-grained customization. Thus, the framework provides a workflow definition and a workflow definition parser.

The workflow definition describes to the system how to partition the inputs into separate jobs, and the job programming associated with each individual job. The workflow definition is associated with a job at the time of execution. For example, the workflow definition could be submitted with a print job by embedding it in the PDL, or used as a scan template/ticket. The workflow definition could be created manually or by using a workflow tool/utility that is capable of generating the definition. Thus, the workflow definition supports multiple job boundaries, multiple job programming definitions, nesting boundaries and job programming, job boundaries based on capabilities of the system (i.e. # pages, insert sheets, image recognition, etc. . . . ), etc.

The workflow definition parser is responsible for translating the workflow definition into the instruction format required by the system. The parser translates the definition into a common internal representation. For example, using job separator sheets in a scan job is different than specifying boundaries in a print job. In this case each job would be "parsed" differently, but would result in a canonical format used during further processing.

With a more flexible definition model (e.g., select multiple resolutions vs. a single resolution used today), more flexible data management is required. Programming attributes can be stored in tables where values can be selected for enumeration, and then a database "join" operation is used to produce the desired permutations. However, due to combinatoric explosion the use of join operations, in some situations this become unmanageable and/or inefficient. Therefore, systems and methods herein can alternatively store job programming attributes in tables or traditional programming language data structures, and then use intelligent iteration across multiple tables/structures to achieve the same effect. Attributes within tables and entire tables have the ability to be enabled or disabled to produce the correct enumeration set efficiently.

Finally, new expanded job template/tickets can be defined by the systems and methods herein, or the systems and methods herein can produce multiple job tickets using existing formats. For example, after the enumeration step has identified the new job programming, the systems and methods herein can generate multiple JDF job tickets to accomplish the same result as a single, expanded job ticket. In this manner existing formats can be leveraged immediately by the systems and methods herein, without changing a specification by producing many job tickets each with a subset of enumerated attributes.

Therefore, the systems and methods herein provide flexible mechanisms to allow fine-grained customization, provide an enhanced job programming model, present methods for defining and automatically generating a spanning set of attributes, use image down-sampling via image processing as part of a more flexible job programming (e.g., scan at 1200 dpi and down-sample at 600 dpi and 300 dpi) to minimize number of scans or raster image processing (RIP) instances required, provide new user operability for specifying templates/job tickets, use a common internal representation of job boundaries, and use custom parsers for each approach of specifying job boundaries results in a consistent internal representation and handling of downstream processing. This allows the systems and methods herein to process more sophisticated workflows and to manage complexity. Further, the automatic enumeration of jobs increases productivity and minimizes error.

As noted above, the systems and methods herein use image down-sampling to increase productivity, because for a single scan or RIP, multiple resolution images produced. In addition, the formal methods for describing job boundaries of the systems and methods herein promote correctness and reduce maintenance expenses, while accommodating many front-end ways of specifying job boundaries. The user interface of the systems and methods herein makes it easy to define complex job programming and extends the reach of existing templates/tickets by turning one job into many.

Figure 4:
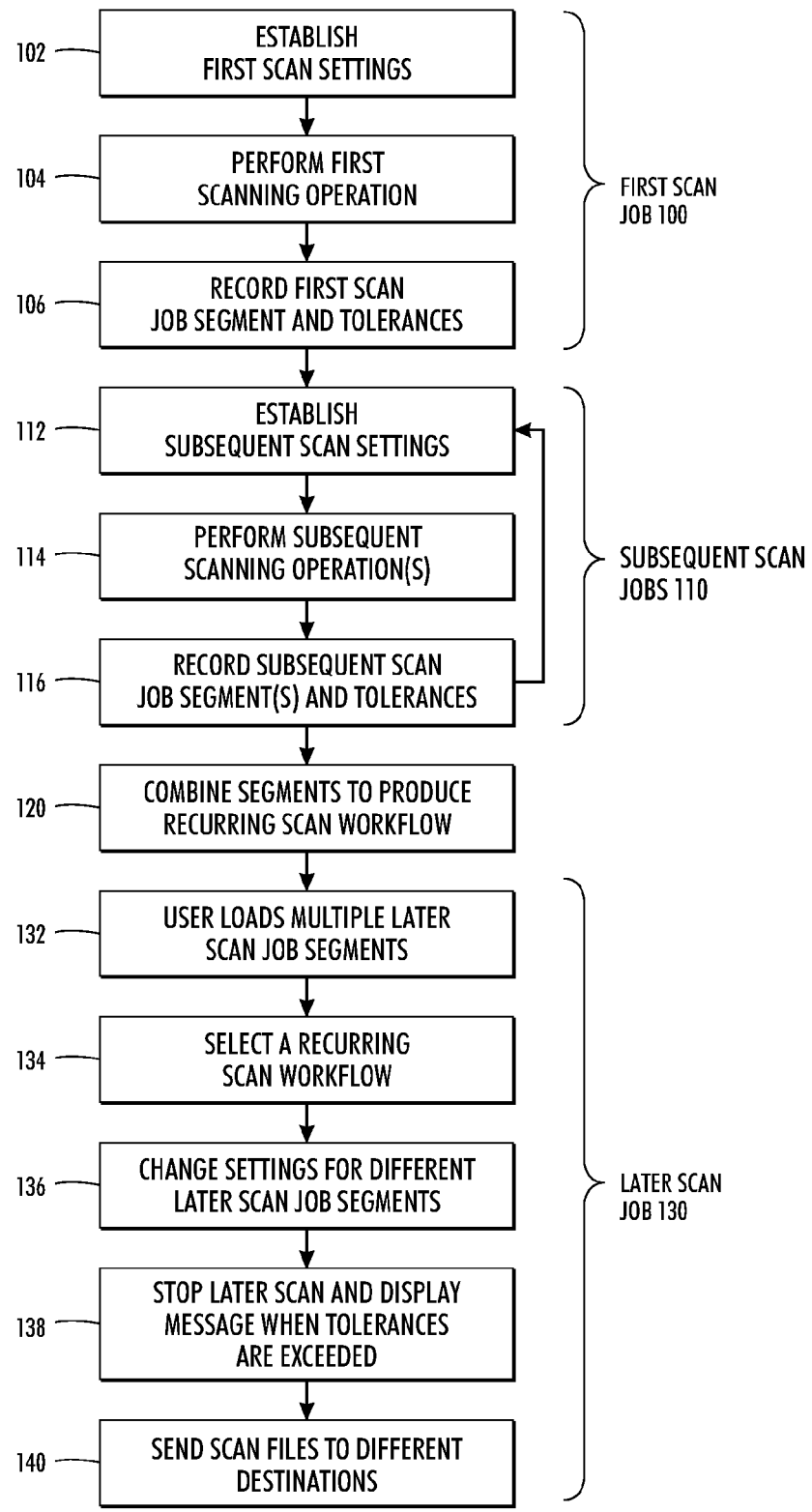
FIG. 4 is a flow diagram illustrating various embodiments herein.

FIG. 4 is a flowchart illustrating the foregoing concepts. In items 102, 104, and 106, the methods herein perform a first scan job 100 by first manually establishing first scan settings (102), using a computerized device. The computerized device can use an optical scanner, and the optical scanner can be integral with the computerized device or operatively connected to the computerized device.

When performing the first scan job 100, such methods perform a first scanning operation in item 104. The first scanning operation scans one or more first items using the optical scanner set to the first scan settings. The first scanning operation produces a first scanned image data file and a first scanning operation data file.

When performing the first scan job 100, such methods also automatically record the first scan settings and the first scanning operation data file as a first scan job segment in a non-transitory computer-readable storage medium (in item 106). The computer-readable storage medium can be integral with the computerized device or operatively connected to the computerized device.

Additionally, such methods perform one or more subsequent scan jobs 110 by manually establishing one or more subsequent scan settings 112 using the computerized device. The first scan settings 102 and the subsequent scan settings 112 comprise, for example, settings for resolution, number of sides, orientation, color mode, contrast, original type, TRC, lighten/darken, sharpness, saturation, background suppression, compression factor, original size, edge erase, blank page removal, as well as other settings depending upon implementation. The subsequent scan settings 112 each have at least one individual setting that is different from a corresponding setting within the first scan settings 102.

When performing the subsequent scan jobs 110, such methods perform one or more subsequent scanning operations 114. Each of the subsequent scanning operations 114 scans one or more subsequent items using the optical scanner set to a corresponding different one of the subsequent scan settings 112. The subsequent scanning operations 114 produce one or more subsequent scanned image data files and one or more subsequent scanning operation data files. When performing the subsequent scan jobs 110, such methods also automatically record the subsequent scan settings 112 and the subsequent scanning operation data files as one or more subsequent scan job segments 116 (individually for each of the subsequent scan jobs 110) in the computer-readable storage medium. The loop from item 116 to item 112 graphically illustrate that there can be one or many subsequent scan jobs 110 that follow the first scan job 100.

The methods herein automatically combine the first scan job segment 106 and the subsequent scan job segments 116 to produce a recurring scan workflow in item 120, using the computerized device. The first scanning operation data file and the subsequent scanning operation data files also contain information of the number of pages scanned.

As shown by item 130, the methods herein then perform at least one later scan job after creating the recurring scan workflow. The later scan job(s) 130 begin when the user loads multiple later scan job segments in item 132 and selects a previously recorded recurring scan workflow 134. During the actual scanning of the later scan job(s) 130 the computerized device automatically changes settings of the optical scanner between segments of the later scan job in item 136, without requiring the user to manually change settings of the optical scanner. The computerized device similarly automatically changes settings of the optical scanner between each segment of the later scan job that correspond to the subsequent scan jobs, without requiring manual changes of the settings of the optical scanner.

Such segments of the later scan job correspond to the first scan job 100 and the subsequent scan jobs 110. More specifically, the segments of the later scan job correspond to the first scan job 100 and the subsequent scan jobs 110 by having the same type, size, and number of sheets as the first scan job 100 and the subsequent scan jobs 110, respectively; however, the segments of the later scan job have different printing, different images, different data, etc., on the sheets that correspond to the same sheets of the first scan job 100 and the subsequent scan jobs 110.

The methods herein can also set tolerances for the recurring scan workflow, using the computerized device, and these can be recorded in items 106 and 116. The tolerances comprise ranges within which the different settings are considered acceptable. Further, when the later segments are not within the tolerances, such embodiments can stop the later segment that is out of tolerance in item 138, and/or such embodiments can merely pause the later segment that is out of tolerance and provide the user options to modify the tolerances in item 138.

In item 140, the methods herein can transmit scan image data files produced for each of the later segments to different destinations. Therefore, as shown in FIG. 3, discussed above, the workflow can cause down-sampling to change the scanned file in some manner (e.g., reduce resolution) and send the different files to different destinations (e.g., file storage 156 and e-mail 158). Similarly, the same file can be sent to different destinations without any down-sampling.

Figure 5:
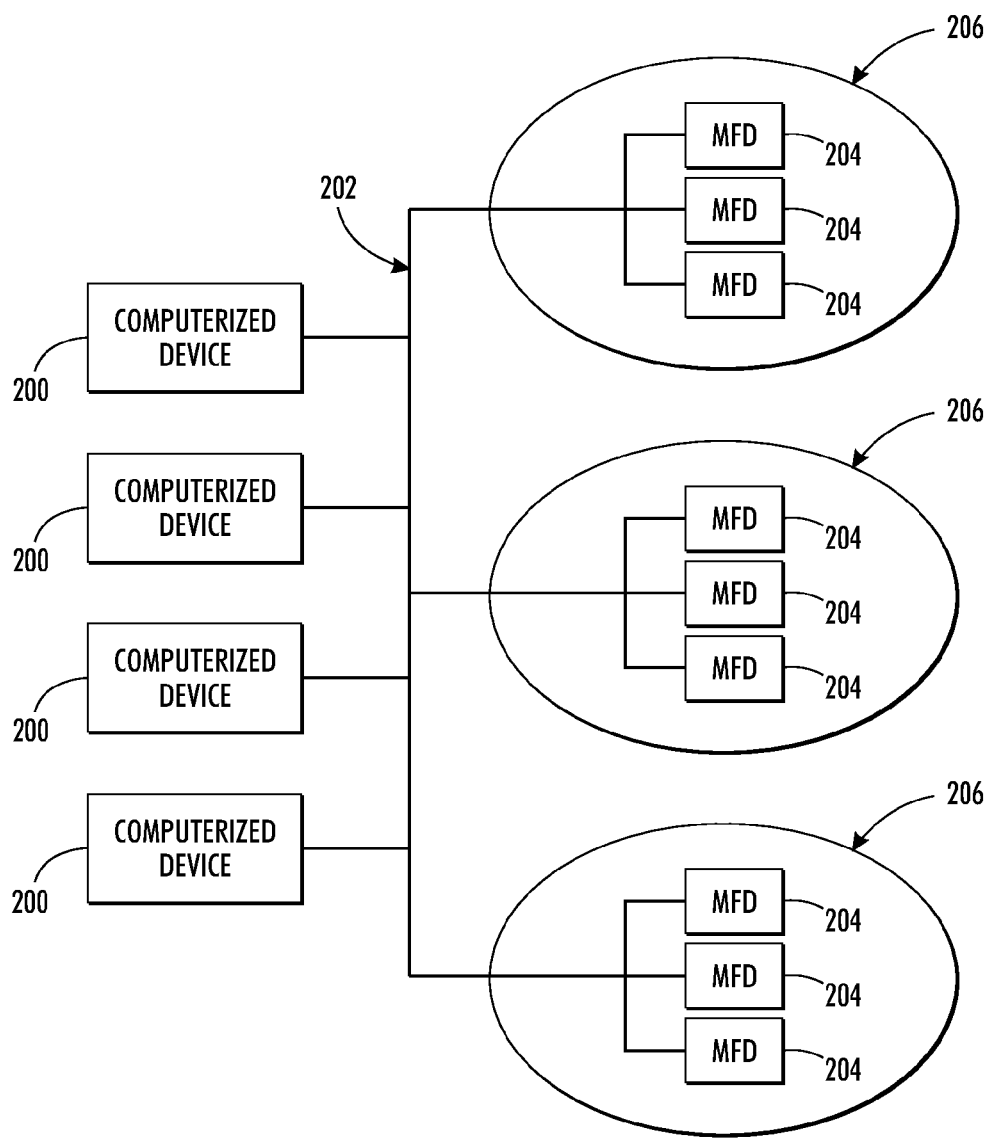
FIG. 5 is a schematic diagram of a system illustrating the operation of various embodiments herein.

As shown in FIG. 5, exemplary system embodiments herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 6:
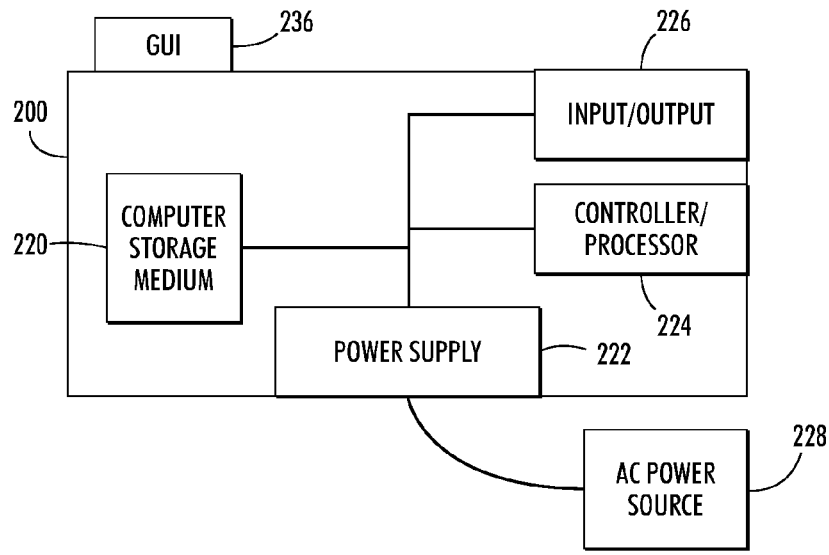
FIG. 6 is a schematic diagram of a computerized device according to various embodiments herein.

FIG. 6 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 7:
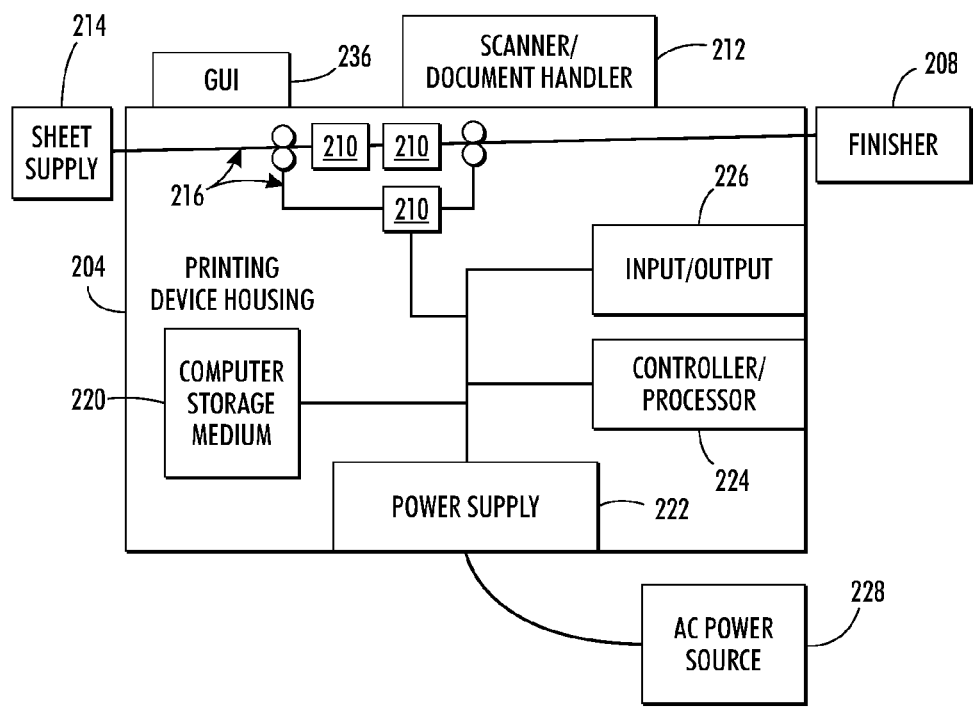
FIG. 7 is a schematic diagram of a printing device according to various embodiments herein.

FIG. 7 illustrates a computerized device that is a printing device 204, which can be used with embodiments herein and can comprise, for example, a printer, copier, multi-function machine, multi-function device (MDF), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

The processors 224 in the computerized device 200 and printing device 204 operate on instructions in the storage medium 220 to perform at least two different segments of a scan job by sequentially scanning the different segments using an optical scanner. Each of the different segments is scanned with the optical scanner manually set to different settings. The different settings include for example, settings for resolution, number of sides, orientation, color mode, contrast, original type, TRC, lighten/darken, sharpness, saturation, background suppression, compression factor, original size, edge erase, blank page removal, as well as other settings depending upon implementation The processors 224 herein automatically combine the different settings to produce a recurring scan workflow using the computerized device. The recurring scan workflow includes such different settings of the different segments and information of the number of pages scanned in each of the different segments. Thus, for example, each of the different segments has at least one individual setting that is different from another one of the different segments.

Further, processors 224 herein perform at least one later scan job having later segments corresponding to the different segments of the original scan job after creating the recurring scan workflow. The later segments corresponding to the different segments by having the same type, size, and number of sheets as corresponding ones of the different segments, and the later segments comprising different printing on the sheets from corresponding sheets of the different segments. During the later scan job the computerized device automatically changes settings of the optical scanner between the later segments, without requiring the user to manually change the different settings between the later segments.

Some processors 224 herein can set tolerances for the recurring scan workflow, using the computerized device. The tolerances are ranges within which the different settings are considered acceptable. In such embodiments the processors 224 herein determine if the later segments are within the tolerances. Further, when the later segments are not within the tolerances, such embodiments can stop the later segment that is out of tolerance. Alternatively, such embodiments can merely pause the later segment that is out of tolerance and provide the user options to modify the tolerances.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:
    performing at least two different segments of a scan job by sequentially scanning said different segments using an optical scanner, each of said different segments being scanned with said optical scanner manually set to different settings;
    automatically combining said different settings to produce a recurring scan workflow using a computerized device, said optical scanner being one of integral with said computerized device and operatively connected to said computerized device;
    saving said recurring scan workflow in a non-transitory storage device;
    recalling said recurring scan workflow from said non-transitory storage device;
    performing at least one later scan job having later segments corresponding to said different segments, after recalling said recurring scan workflow; and
    during said later scan job automatically, using said computerized device, changing settings of said optical scanner between said later segments based on said recurring scan workflow, without manually changing said different settings between said later segments.

2. The method according to claim 1, further comprising naming said recurring scan workflow with a unique name different than other recurring scan workflows, using said computerized device.

3. The method according to claim 1, said later segments corresponding to said different segments by having a same type, size, and number of sheets as corresponding ones of said different segments, and said later segments comprising different printing on sheets corresponding to said different segments.

4. The method according to claim 1, said different settings comprising settings for at least one of resolution, number of sides, orientation, color mode, contrast, original type including tone reproduction curve (TRC), lighten and darken, sharpness, saturation, background suppression, compression factor, original size, edge erase, and blank page removal, and
    said recurring scan workflow comprising information of a number of pages scanned in each of said different segments.

5. The method according to claim 1, further comprising transmitting scan image data files produced for each of said later segments to different destinations.

6. A method comprising:
    performing at least two different segments of a scan job by sequentially scanning said different segments using an optical scanner, each of said different segments being scanned with said optical scanner manually set to different settings;
    automatically combining said different settings to produce a recurring scan workflow using a computerized device, said optical scanner being one of integral with said computerized device and operatively connected to said computerized device;
    determining universal settings of said optical scanner that will accommodate all setting ranges of said different segments;
    saving said recurring scan workflow in a non-transitory storage device;
    recalling said recurring scan workflow from said non-transitory storage device;
    performing at least one later scan job having later segments corresponding to said different segments after recalling said recurring scan workflow; and
    during said later scan job automatically, using said computerized device:
        scanning said later segments using said optical scanner set to said universal settings, without changing settings of said optical scanner between said later segments; and
        performing post-scan processing to change scan image data files produced for each of said later segments to comply with said different settings of said recurring scan workflow.

7. The method according to claim 6, further comprising naming said recurring scan workflow with a unique name different than other recurring scan workflows, using said computerized device.

8. The method according to claim 6, said later segments corresponding to said different segments by having a same type, size, and number of sheets as corresponding ones of said different segments, and said later segments comprising different printing on sheets corresponding to said different segments.

9. The method according to claim 6, said different settings comprising settings for at least one of resolution, number of sides, orientation, color mode, contrast, original type including tone reproduction curve (TRC), lighten and darken, sharpness, saturation, background suppression, compression factor, original size, edge erase, and blank page removal, and
    said recurring scan workflow comprising information of a number of pages scanned in each of said different segments.

10. The method according to claim 6, further comprising transmitting said scan image data files produced for each of said later segments to different destinations.

11. A method comprising:
performing a first scan job by:
manually establishing first scan settings using a computerized device, said computerized device comprising an optical scanner, said optical scanner being one of integral with said computerized device and operatively connected to said computerized device;
performing a first scanning operation, said first scanning operation scanning one or more first items using said optical scanner set to said first scan settings, said first scanning operation producing a first scanned image data file and a first scanning operation data file; and
automatically recording said first scan settings and said first scanning operation data file as a first scan job segment in a non-transitory computer-readable storage medium, said computer-readable storage medium being one of integral with said computerized device and operatively connected to said computerized device;
performing one or more subsequent scan jobs by:
manually establishing one or more subsequent scan settings using said computerized device, said subsequent scan settings being different from said first scan settings;
performing one or more subsequent scanning operations, each of said subsequent scanning operations scanning one or more subsequent items using said optical scanner set to a corresponding one of said subsequent scan settings, said subsequent scanning operations producing one or more subsequent scanned image data files and one or more subsequent scanning operation data files; and
automatically recording said subsequent scan settings and said subsequent scanning operation data files as one or more subsequent scan job segments, individually for each of said subsequent scan jobs, in said computer-readable storage medium;
automatically combining said first scan job segment and said subsequent scan job segments to produce a recurring scan workflow, using said computerized device;
saving said recurring scan workflow in a non-transitory storage device;
recalling said recurring scan workflow from said non-transitory storage device;
performing at least one later scan job after recalling said recurring scan workflow; and
during said later scan job automatically, using said computerized device, changing settings of said optical scanner between segments of said later scan job corresponding to said first scan job and said subsequent scan jobs based on said recurring scan workflow, and changing settings of said optical scanner between each segment of said later scan job corresponding to said subsequent scan jobs based on said recurring scan workflow, without manually changing settings of said optical scanner.

12. The method according to claim 11, further comprising naming said recurring scan workflow with a unique name different than other recurring scan workflows, using said computerized device.

13. The method according to claim 11, said segments of said later scan job corresponding to said first scan job and said subsequent scan jobs by having a same type, size, and number of sheets as said first scan job and said subsequent scan jobs, respectively, and
said segments of said later scan job comprising different printing on sheets corresponding to said first scan job and said subsequent scan jobs.

14. The method according to claim 11, said first scan settings and said subsequent scan settings comprising settings for at least one of resolution, number of sides, orientation, color mode, contrast, original type including tone reproduction curve (TRC), lighten and darken, sharpness, saturation, background suppression, compression factor, original size, edge erase, and blank page removal, and
said first scanning operation data file and said subsequent scanning operation data files comprising information of a number of pages scanned.

15. The method according to claim 11, said subsequent scan settings each comprising at least one individual setting that is different from a corresponding setting within said first scan settings.

16. A non-transitory computer-readable storage medium storing instructions executable by a computerized device, said instructions causing said computerized device to perform a method comprising:
performing at least two different segments of a scan job by sequentially scanning said different segments using an optical scanner, each of said different segments being scanned with said optical scanner manually set to different settings;
automatically combining said different settings to produce a recurring scan workflow;
saving said recurring scan workflow in a non-transitory storage device;
recalling said recurring scan workflow from said non-transitory storage device;
performing at least one later scan job having later segments corresponding to said different segments after recalling said recurring scan workflow; and
during said later scan job automatically changing settings of said optical scanner between said later segments based on said recurring scan workflow, without manually changing said different settings between said later segments.

17. The non-transitory computer-readable storage medium according to claim 16, said method further comprising naming said recurring scan workflow with a unique name different than other recurring scan workflows.

18. The non-transitory computer-readable storage medium according to claim 16, said later segments corresponding to said different segments by having a same type, size, and number of sheets as corresponding ones of said different segments, and said later segments comprising different printing on sheets corresponding to said different segments.

19. The non-transitory computer-readable storage medium according to claim 16, said different settings comprising settings for at least one of resolution, number of sides, orientation, color mode, contrast, original type including tone reproduction curve (TRC), lighten and darken, sharpness, saturation, background suppression, compression factor, original size, edge erase, and blank page removal, and
said recurring scan workflow comprising information of a number of pages scanned in each of said different segments.

20. The non-transitory computer-readable storage medium according to claim 16, further comprising transmitting scan image data files produced for each of said later segments to different destinations.

* * * * *